United States Patent
Rebs, Sr.

(10) Patent No.: US 6,557,668 B2
(45) Date of Patent: May 6, 2003

(54) DEVICE FOR DISTRIBUTING AN OIL-AIR MIXTURE TO VARIOUS LUBRICATING CHANNELS OF THE MACHINE HOUSING

(75) Inventor: Alexander Rebs, Sr., Ratingen (DE)

(73) Assignee: Rebs Zentralschmiertechnik GmbH, Ratingen (DE)

( * ) Notice: Subject to any disclaimer, the term of this patent is extended or adjusted under 35 U.S.C. 154(b) by 0 days.

(21) Appl. No.: 10/193,052

(22) Filed: Jul. 11, 2002

(65) Prior Publication Data

US 2002/0179374 A1 Dec. 5, 2002

Related U.S. Application Data

(63) Continuation of application No. 09/367,776, filed as application No. PCT/EP98/00349 on Jan. 18, 1999, now abandoned.

(30) Foreign Application Priority Data

Feb. 19, 1997 (DE) .......................................... 297 02 850

(51) Int. Cl.[7] .................................................. F16N 7/30
(52) U.S. Cl. ....................................... 184/55.1; 285/9.2
(58) Field of Search ................................. 184/7.4, 6.24, 184/55.1, 105.3; 403/300, 301, 305, 346, 361; 277/608, 609, 910; 285/9.2, 347, 374

(56) References Cited

U.S. PATENT DOCUMENTS

| | | |
|---|---|---|
| 1,710,203 A | 4/1929 | Burstall |
| 2,283,638 A | 5/1942 | Klein et al. |
| 2,564,938 A | 8/1951 | Warren .......................... 285/95 |
| 2,589,656 A | 3/1952 | Armstrong .................... 166/10 |
| 2,695,795 A | 11/1954 | Tamminga ................... 285/120 |
| 2,862,475 A | 12/1958 | Kinsman ...................... 121/13 |
| 3,120,967 A | 2/1964 | Kazienko ..................... 285/231 |
| 3,137,509 A | 6/1964 | Kazienko ..................... 277/170 |
| 3,297,106 A | 1/1967 | Hanson et al. .................. 184/7 |
| 3,304,104 A | 2/1967 | Wiltse ............................ 285/5 |
| 4,290,497 A | 9/1981 | Barnetche .................... 175/371 |
| 4,795,173 A | 1/1989 | Osborne ...................... 277/168 |
| 4,936,512 A | 6/1990 | Tremoulet, Jr. ............. 239/596 |
| 5,154,259 A | 10/1992 | Magome ...................... 184/7.4 |
| 5,497,852 A | 3/1996 | Little et al. ................... 184/7.4 |
| 5,628,384 A | 5/1997 | Mismas ........................ 184/7.4 |
| 5,863,048 A | 1/1999 | Pingel .......................... 277/609 |

FOREIGN PATENT DOCUMENTS

| | | | | |
|---|---|---|---|---|
| DE | 296 13 087 U1 | 9/1996 | ............. | F16N/7/38 |
| EP | 0 596 230 A1 | 9/1993 | .......... | F16L/21/025 |
| FR | 1 049 913 A | 1/1954 | ....................... | 15/4 |
| FR | 2 433 698 A | 3/1980 | ............ | F16L/21/04 |
| GB | 2 296 300 A | 6/1996 | ............ | F16L/21/08 |

Primary Examiner—Chong H. Kim
(74) Attorney, Agent, or Firm—Greenberg Traurig, P.C.

(57) ABSTRACT

A device for distributing an oil-air mixture to various lubrication channels disposed in a bore (10) of a machine housing, comprises at least one cylindrical distributor (1) which is sealed on at least one of its front sides (8) towards the bore wall by a sealing ring (7) and whose axial position in the bore (10) is determined by at least one spacer (2), whereby the distributor (1) and the spacer (2) are introduced individually into the bore (10).

4 Claims, 2 Drawing Sheets

DEVICE FOR DISTRIBUTING AN OIL-AIR MIXTURE TO VARIOUS LUBRICATING CHANNELS OF THE MACHINE HOUSING

CROSS-REFERENCE TO RELATED APPLICATIONS

This application is a continuation of and claims the benefit of U.S. patent application Ser. No. 09/367,776, filed Nov. 22, 1999, now abandoned, which is a 371 of PCT/EP98/00349 filed Jan. 18, 1999.

BACKGROUND OF THE DISCLOSURE

1. Field of the Invention

The present invention relates to a device for distributing an oil-air mixture to various lubrication channels of the machine housing disposed in a bore of a machine housing, comprising at least one cylindrical distributor which is sealed on at least one of its front sides towards the bore wall by means of a sealing ring and whose axial position in the bore is determined by at least one spacer, whereby the distributor and the spacer can be introduced individually into the bore. Devices of this type have proven themselves in practice on the basis of their simple, modular structure and their resulting versatility. They enable the precisely metered distribution of quantities of lubricants conveyed in a central supply line as an oil-air mixture to a plurality of lubrication points.

2. Background Art

Based on the large number of lubrication points present in a rolling mill for example or their inaccessibility, it is generally necessary to place specific bores of considerable length into the machine housing to accommodate the distributors. The distributors and spacers associated with a device of the present type are inserted in a conventional manner into these bores by means of special tools of appropriate length and positioned there. There is an attendant problem in aligning the annular seals required for sealing the individual distributors in their proper sealing position.

To solve the problems associated with the assembly of devices of the initially described kind the German utility model DE 296 13 087 U1 proposes combining the individual modules such as the distributors, spacers and seals into a columnar unit and inserting this unit into the bore. The unit can be braced in the bore in an axial direction by bracing means pressing together of the annular seals.

The device known from the abovementioned utility model does enable simplified insertion or withdrawal of the elements combined into one structural unit into or out of the bore of the machine housing. In order to achieve this, however, complicated assembly of the columnar unit has to be considered with the aid of a plurality of additional structural elements. The complexity of the columnar unit not only restricts the versatility of the device known from the utility model, but also considerably raises its manufacturing and maintenance costs relative to the anticipated state of the art.

The object of the present invention is to make easier the mounting of a device of the kind initially described by simple means.

SUMMARY OF THE INVENTION

This task is solved by the distributor and/or spacer comprising a heel formed on its front whose diameter matches the diameter of the annular seal in such a way that the external diameter of the annular seal is less than the internal diameter of the bore in its state when set on the heel, and that the heel can be inserted into a depression formed in the front of the respective distributor or spacer assigned to the front of the respective distributor or spacer and whose diameter is at most identical to the diameter of the heel.

According to the present invention it is proposed to equip the distributors and spacers corresponding to the succession of these components with a heel formed on their front. The annular seal required for sealing can be set on the heel for insertion into the bore of the machine housing. The dimensions of the heel hereby match the dimensions of the sealing ring such that the external diameter of the ring in its state when set on the heel is less than the internal diameter of the bore. Because of this there is no contact between the bore wall and the seal during insertion of the annular seal into the bore. In this way, the sealing ring can be inserted into the bore in a conceivably simple manner without the risk of being shorn off at the orifices of the lubrication channels.

When the distributor or the spacer has reached its position established by a previously inserted distributor or a previously inserted spacer, the heel of the distributor or of the spacer engages in the corresponding depression of the previously inserted element. As the diameter of the depression matches the diameter of the heel, and is therefore less than the external diameter of the annular seal, the annular seal is pressed, along with insertion of the heel into the depression, between the edge of the depression and the front of the distributor or spacer until it sits closely on the bore wall and seals off the adjacent elements from one another.

A preferred design of the present invention is characterised in that the heel is designed in the form of a frustum with increasing gradient in the direction of the distributor or spacer. The sealing ring set on the heel is reliably and smoothly expanded until its sealing position is attained as the heel is inserted into the depression assigned to the heel because of the conical contour of the heel increasing in the direction of distributor or the spacer.

It is also an advantage if a boss extending radially and holding the annular seal on the heel is designed on the heel itself. Placing of the annular seal is made easier by this boss, ensuring that it is held securely as it is being inserted into the bore. This applies especially if the boss has an annular design. A configuration of the invention which protects the sealing ring especially against damage is characterised in this respect in that the transition between the heel and the boss is designed in the manner of a cone.

BRIEF DESCRIPTION OF THE DRAWINGS

The invention will now be explained hereinafter in greater detail by means of a diagram illustrating an embodiment in sectional views, in which.

DETAILED DESCRIPTION OF THE DRAWINGS

Figure 1:
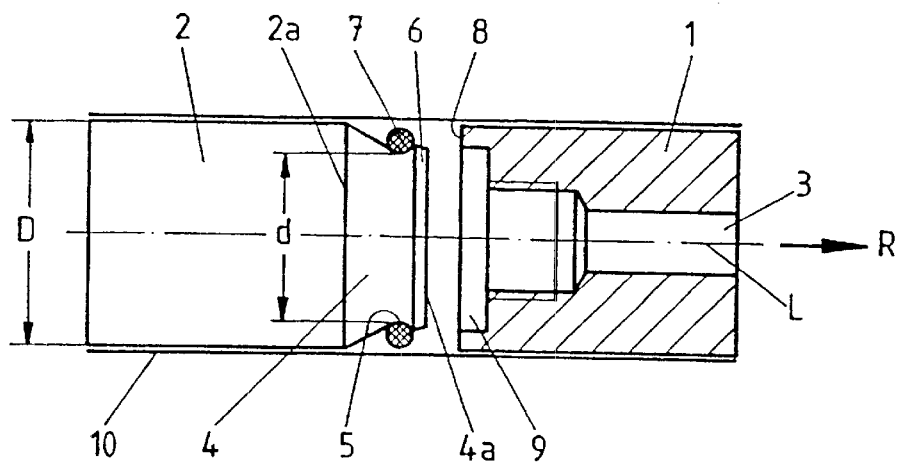
FIG. 1 shows an oil-air distribution device in a first assembly position in a longitudinal section.

The device for distributing an oil-air mixture to a plurality of lubrication channels, not illustrated here, shown in crosssection in the figures comprises a distributor 1 and a spacer 2. Both distributor 1 and spacer 2 are provided with a central, axially running bore 3 for the oil-air mixture.

Formed on front 2a of spacer 2 is a conical heel 4 verging in the direction of its front 4a within a conical groove 5 into an annular boss 6. The circular surface of boss 6 is angled obliquely dropping in the direction of front 4a to make it easier to slide an annular seal 7 onto heel 4 in a nondestructive manner.

In the vicinity of its conical groove 5 diameter d of heel 4 is identical to the diameter of annular seal 7 in the unstressed state and increases in the direction of front 2a of spacer 2. After it is slid on over boss 6 annular seal 7 therefore rests unstressed in groove 5 of heel 4, as in FIG. 1, and is expanded evenly when moved in the direction of front 2a of spacer 2. in the unstressed state the external diameter of annular seal 7 is less than external diameter D of spacer 2.

Formed coaxially to longitudinal axis L into front 8 of distributor 1 assigned to spacer 2 is a depression 9 whose diameter is slightly greater than the diameter of radially circumferential boss 6 and accordingly essentially less than external diameter D of spacer 2. On its other front, not illustrated here, spacer 2 is equipped with a depression corresponding to depression 9. In exactly the same way, distributor 1 can be provided on its other front, not illustrated here, with a heel corresponding to heel 4.

Figure 2:
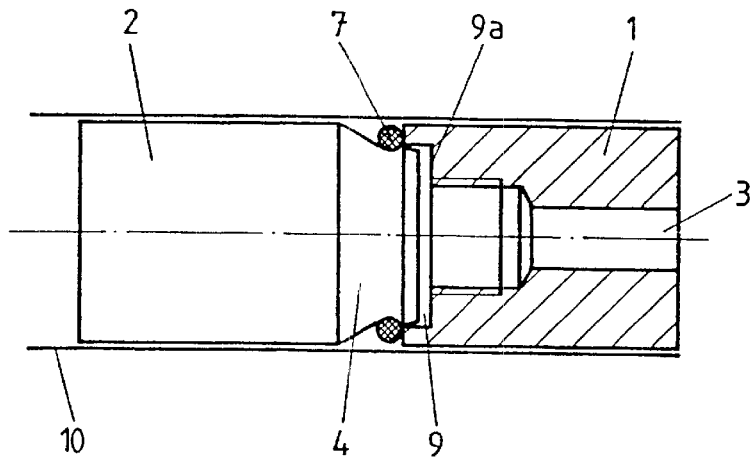
FIG. 2 shows the oil-air distribution device according to FIG. 1 in a second assembly position in a longitudinal section.
Figure 3:
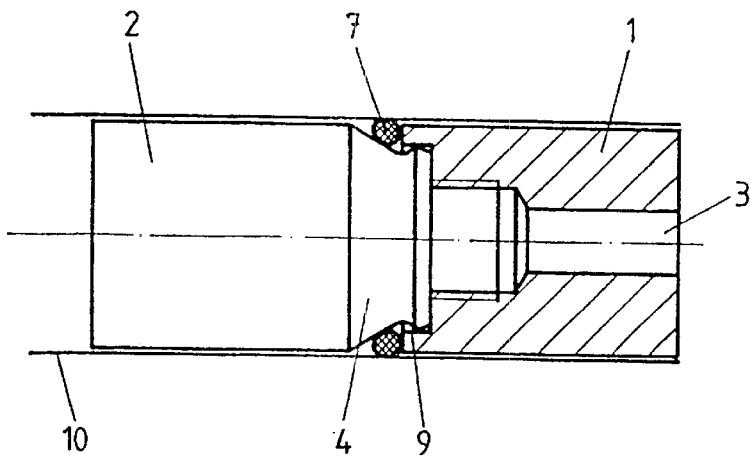
FIG. 3 shows the oil-air distribution device according to FIGS. 1 and 2 in a third assembly position in a longitudinal section.

For assembling the distribution device distributor 1 is first inserted into bore 10 of a machine housing, also not illustrated here, whereby its front 8 provided with depression 9 is aligned opposite to the plug-in direction R. Next spacer 2 is pushed into bore 10 until boss 6 of heel 4 has reached depression 9 of previously pushed-in distributor 1. Annular seal 7 now lies on the annular surface of front 8 of distributor 1 forming the edge of depression 9, as in FIG. 2. Then spacer 2 is moved further in plug-in direction R until boss 6 has reached base 9a of depression 9. At this point annular seal 7 is sliding in conical heel 4 and is expanded until it is squeezed in the end position between the wall of bore 10 and heel 4, as in FIG. 3. Assembly of the device is completed by sliding on other distributors and spacers, not illustrated here, which are sealed from one another in the manner described hereinabove.

Figure 4:
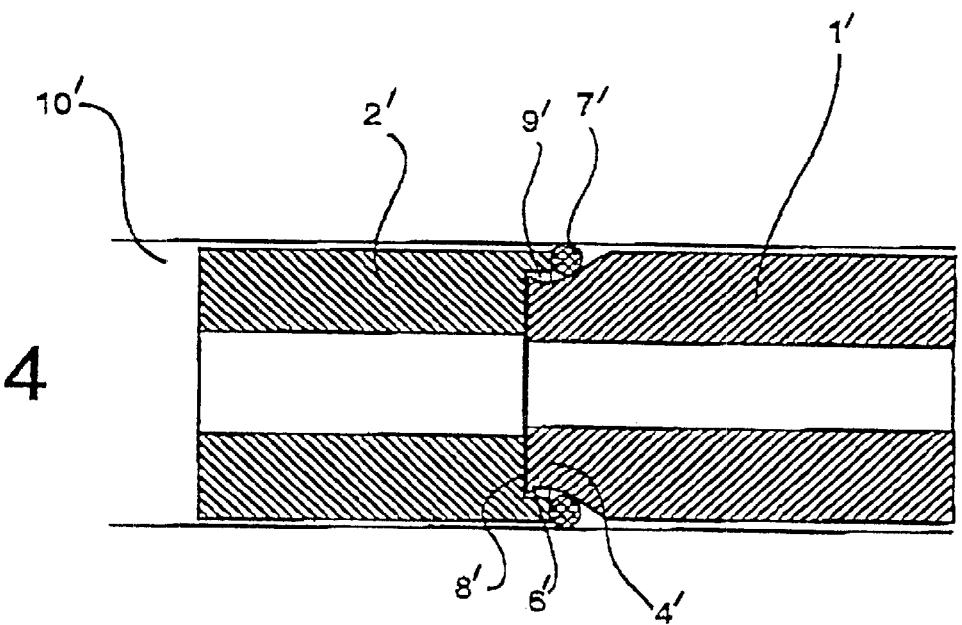
FIG. 4 shows a further embodiment of the invention, in which the heel is formed on the distributor rather than the spacer, in a longitudinal section.

A further embodiment of the invention is shown in FIG. 4, in which a heel 4' is formed on the one front end 8' of a cylindrical distributor 1', the heel 4' having the shape of a frustum. The heel 4' furthermore comprises an annular boss 6' formed proximate to the front end of the heel 4', said boss 6' having an external diameter greater than the external diameter of the portion of the heel 4' immediately adjacent the boss 6'. A sealing ring 7' having an external diameter that is less than the diameter of the bore hole 10' in its unexpanded state is maintained in place on the heel 4' by the boss 6' during introduction of the spacer 2' into the bore 10'.

The spacer 2' includes a depression 9' formed in its first end, said depression 9' having an internal diameter at least equal to the external diameter of the boss 6'. By inserting at least the boss 6' of the heel 4' into the depression 9', the sealing ring 7' is expanded towards the walls forming the bore hole 10' in that the sealing ring 7' is axially supported on the wall surrounding the depression 9' of the spacer 2' during inserting the boss 6' of the heel 4' into the depression 9'. Accordingly, the sealing ring 7' is axially moved on the heel 4' and expanded corresponding to the increase of the inclination of heel 4'.

What is claimed is:

1. A device for distributing an oil-air mixture to various lubrication channels of a machine housing, said device being disposed in a bore hole within said machine housing, said device comprising:

at least one cylindrical distributor having first and second ends;

at least one spacer having first and second ends, wherein the at least one spacer comprises a heel with an external diameter in the shape of a frustum formed proximate to the first end thereof;

said heel further comprises an annular boss formed proximate an end of the heel, said boss having an external diameter greater than the external diameter of the portion of the heel immediately adjacent the boss;

a sealing ring having an external diameter that is less than the diameter of the bore whole when the sealing ring is unexpanded, wherein the sealing ring is maintained in place on the heel by the boss during introduction of the at least one spacer into the bore;

said at least one cylindrical distributor includes a depression formed in the first end thereof, said depression having an internal diameter at least equal to the external diameter of the boss; and said heel being inserted into the depression in order to expand the sealing ring towards the walls forming the bore hole, towards maintaining the axial position of the at least one spacer and the at least one cylindrical distributor relative to the bore hole.

2. A device as claimed in claim 1, wherein the transition between the heel and the boss forms a groove for receipt of the sealing ring.

3. A device for distributing an oil-air mixture to various lubrication channels of a machine housing, said device being disposed in a bore hole within said machine housing, said device comprising:

at least one cylindrical distributor having first and second ends, wherein the at least one cylindrical distributor comprises a heel with an external diameter in the shape of a frustum formed proximate to the first end thereof;

at least one spacer having first and second ends;

said heel further comprises an annular boss formed proximate an end of the heel, said boss having an external diameter greater than the external diameter of the portion of the heel immediately adjacent the boss;

a sealing ring having an external diameter that is less than the diameter of the bore hole when the sealing ring is unexpanded, wherein the sealing ring is maintained in place on the heel by the boss during introduction of the at least one cylindrical distributor into the bore;

said at least one spacer includes a depression formed in the first end thereof, said depression having an internal diameter at least equal to the external diameter of the boss; and said heel being inserted into the depression in order to expand the sealing ring towards the walls forming the bore hole, towards maintaining the axial position of the at least one spacer and the at least one cylindrical distributor relative to the bore hole.

4. A device as claimed in claim 3, wherein the transition between the heel and the boss forms a groove for receipt of the sealing ring.

* * * * *